(12) United States Patent
Hamilton et al.

(10) Patent No.: US 10,185,701 B2
(45) Date of Patent: Jan. 22, 2019

(54) UNSUPPORTED CHARACTER CODE DETECTION MECHANISM

(71) Applicant: Microsoft Technology Licensing, LLC, Redmond, WA (US)

(72) Inventors: Michael Steven Hamilton, London (GB); Oliver Jones, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 15/295,770

(22) Filed: Oct. 17, 2016

(65) Prior Publication Data

US 2018/0107651 A1    Apr. 19, 2018

(51) Int. Cl.
| | |
|---|---|
| *G06F 17/21* | (2006.01) |
| *G06K 9/00* | (2006.01) |
| *G06K 9/68* | (2006.01) |
| *G06K 9/62* | (2006.01) |
| *G06F 3/0482* | (2013.01) |

(52) U.S. Cl.
CPC .......... *G06F 17/214* (2013.01); *G06F 17/21* (2013.01); *G06K 9/00422* (2013.01); *G06K 9/6878* (2013.01); *G06F 3/0482* (2013.01); *G06K 9/6202* (2013.01); *G06K 2209/01* (2013.01)

(58) Field of Classification Search
CPC .. G06F 17/2765; G06F 17/214; G06F 3/0482; G06K 9/18; G06K 9/6202
See application file for complete search history.

(56) References Cited

U.S. PATENT DOCUMENTS

| | | | | |
|---|---|---|---|---|
| 5,034,989 | A  * | 7/1991  | Loh ................... | G06K 9/00416 382/189 |
| 5,530,775 | A  * | 6/1996  | Avi-Itzhak ........... | G06K 9/6255 382/159 |
| 6,421,055 | B1 * | 7/2002  | Jones ................... | G06F 3/1225 345/471 |
| 7,167,731 | B2 | 1/2007 | Nelson | |
| 7,292,870 | B2 | 11/2007 | Heredia et al. | |

(Continued)

OTHER PUBLICATIONS

"Can I Emoji", Published on: Feb. 9, 2014 Available at: http://caniemoji.com/.

(Continued)

*Primary Examiner* — Ming Y Hon
(74) *Attorney, Agent, or Firm* — Schwegman Lundberg & Woessner, P.A.

(57) ABSTRACT

An electronic device is described which comprises a memory storing a font comprising a mapping from character codes to glyphs. The memory also stores character information comprising at least information about one or more unsupported character codes. A processor of the device processes text content comprising character codes using the font to create text output by converting the character codes into glyphs for display at a display associated with the electronic device. The processor is configured to capture the text output and detect whether the text output comprises at least one unsupported character code; and, in the case that at least one unsupported character code is detected, to output to a user of the device information about the unsupported character code obtained from the character information.

16 Claims, 8 Drawing Sheets

(56) References Cited

U.S. PATENT DOCUMENTS

| | | | |
|---|---|---|---|
| 8,510,473 B1* | 8/2013 | Leonard | H04L 67/2823 709/232 |
| 8,700,072 B2 | 4/2014 | Pascal et al. | |
| 9,785,659 B2* | 10/2017 | Liu | G06F 17/303 |
| 2004/0047508 A1* | 3/2004 | Anisimovich | G06K 9/6255 382/218 |
| 2006/0130006 A1* | 6/2006 | Chitale | G06F 17/275 717/136 |
| 2006/0200568 A1 | 9/2006 | Kim | |
| 2006/0268007 A1* | 11/2006 | Gopalakrishnan | G06F 17/30244 345/619 |
| 2008/0052363 A1 | 2/2008 | Pousti | |
| 2008/0059152 A1 | 3/2008 | Fridman et al. | |
| 2008/0079730 A1* | 4/2008 | Zhang | G06F 17/214 345/468 |
| 2009/0109227 A1* | 4/2009 | Leroy | G06T 11/203 345/467 |
| 2011/0238406 A1* | 9/2011 | Chen | G06F 17/2735 704/3 |
| 2012/0079374 A1* | 3/2012 | Gaddis | G06F 17/30905 715/269 |
| 2013/0307779 A1 | 11/2013 | Towell et al. | |
| 2013/0316695 A1 | 11/2013 | Park | |
| 2015/0100537 A1 | 4/2015 | Grieves et al. | |
| 2016/0080298 A1 | 3/2016 | Oh et al. | |
| 2017/0063393 A1* | 3/2017 | Shelton | H03M 11/20 |
| 2017/0109838 A1* | 4/2017 | Byron | G06Q 50/01 |
| 2017/0185581 A1* | 6/2017 | Bojja | G06F 17/276 |
| 2017/0262474 A1* | 9/2017 | Chen | G06F 17/30253 |
| 2017/0308289 A1* | 10/2017 | Kim | G06F 3/04886 |
| 2018/0034896 A1* | 2/2018 | Seacat DeLuca | H04L 67/10 |

OTHER PUBLICATIONS

"I don't see any emoji on Android. How do I get them?", Published on: Jun. 17, 2015 Available at: https://support.swiftkey.com/hc/en-us/articles/201457992-I-don-t-see-any-emoji-on-Android-How-do-I-get-them-.

Purewal, Sarah Jacobsson, "How to Get Emojis on your Android phone", Published on: Apr. 15, 2016 Available at: https://www.cnet.com/how-to/how-to-get-emojis-on-your-android-phone/.

Carlos, S., "How to Enable Emoji and Emoticons on Android", Published on: Aug. 12, 2013 Available at: http://droidlessons.com/how-to-enable-emoji-and-emoticons-on-android/.

* cited by examiner

UNSUPPORTED CHARACTER CODE DETECTION MECHANISM

BACKGROUND

Characters such as emoji, emoticons, letters, symbols, punctuation marks and other characters are typically represented using numerical codes in order to be dealt with using computers. Various different encodings are available although Unicode encodings are in widespread use and Unicode has become a dominant scheme for digital processing and storage of text.

Unicode provides a unique code for a character according to the Unicode standard as developed by the Unicode Consortium. The latest version of the Unicode standard is version 9.0.0 and comprises a core specification together with code charts, Unicode standard annexes and a Unicode character database. Rather than mapping characters directly to numbers in byte form, Unicode defines what characters are available (in the character database), corresponding natural numbers (referred to as code points), how those numbers are encoded as a series of fixed-size natural numbers (code units) and how the units are encoded as a stream of bytes.

Generally speaking, when a computing device interprets Unicode (or other character codes) in order to render one or more characters it typically does so using a font available at the computing device where the font is a mapping from Unicode code points (or other character codes) to glyphs. A glyph is a graphical representation of a character code or a sequence of character codes. An example of a glyph is the letter "a" in a particular graphical style, or the letter "a" in a different graphical style. An example of a glyph mapped from a sequence of character codes is "á" where the sequence of character codes comprises a character code for the letter "a" and a character code for the accent character.

Where a character code (such as a Unicode code point) is unsupported by an electronic device the electronic device converts a code representation of the character to an incorrect glyph. An incorrect glyph is a graphical representation of a character which is not the same as the graphical representation of the character which was intended by an encoder of the character code. The incorrect glyph may be a default glyph used by the electronic device when it cannot determine the correct glyph, or may be a glyph with a different form from the intended glyph.

Because unsupported character codes lead to errors in storage, communication and processing of character data there is an ongoing need for ways of accurately detecting unsupported character codes. In some cases a user may be unaware that a computing device has processed an unsupported character code and this leads to confusion on the part of the user who does not understand the state of the computing device.

The embodiments described below are not limited to implementations which solve any or all of the disadvantages of known unsupported character code detection mechanisms.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An electronic device is described which comprises a memory storing a font comprising a mapping from character codes to glyphs. The memory also stores character information comprising at least information about one or more unsupported character codes. A processor of the device processes text content comprising character codes using the font to create text output by converting the character codes into glyphs for display at a display associated with the electronic device. The processor is configured to capture the text output and detect whether the text output comprises at least one unsupported character code; and, in the case that at least one unsupported character code is detected, to output to a user of the device information about the unsupported character code obtained from the character information.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
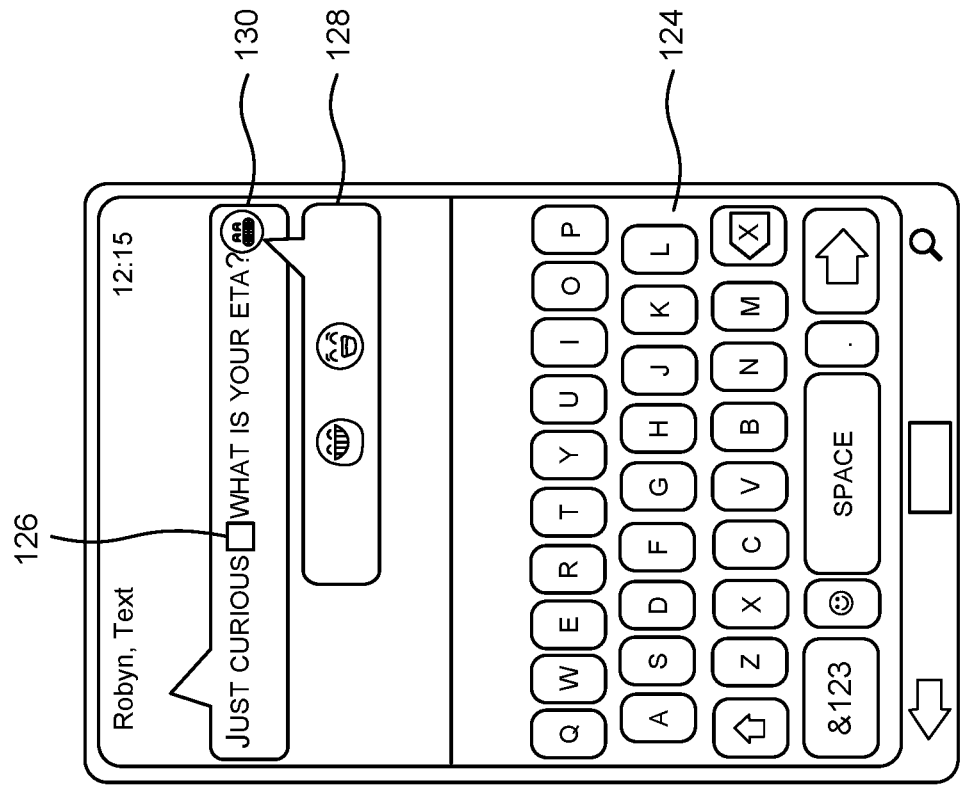
FIG. 1 is a schematic diagram of two user interface displays of an electronic device, where the electronic device incorporates an unsupported character code detection mechanism.
Figure 1:
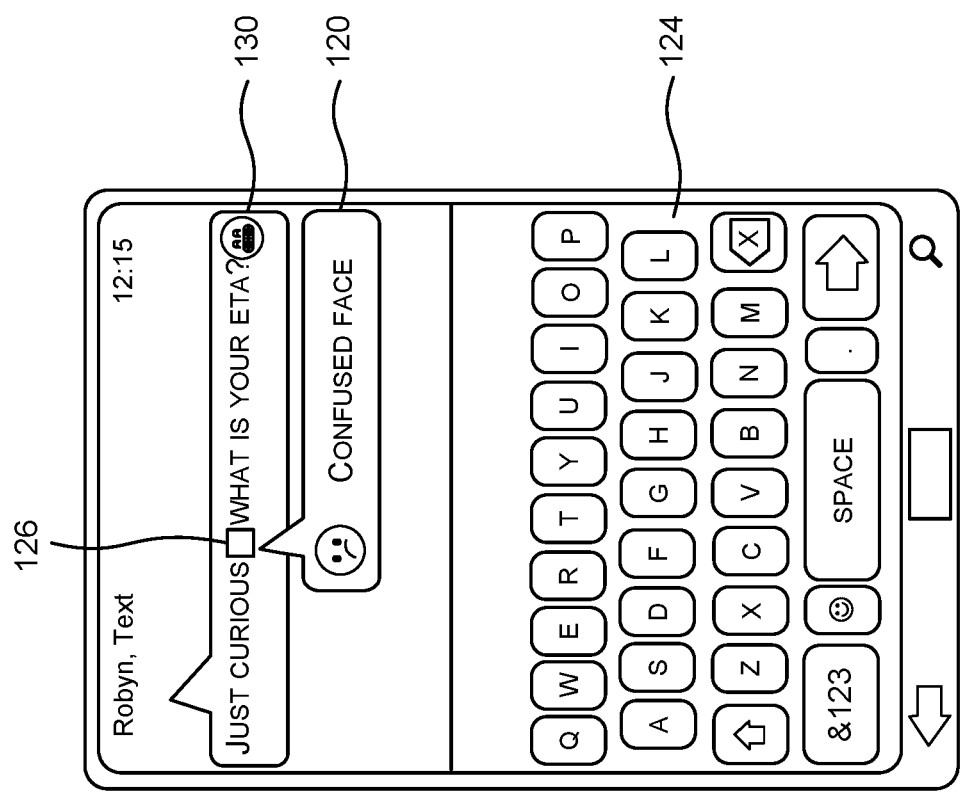

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Where a computing device is unable to map from a character code to a glyph it typically outputs a default glyph such as an unfilled rectangle or square. In this situation the user of the computing device is unaware what the character code is and is unable to find the character code from the internal state of the computing device easily. In other situations, a computing device maps from a character code to a glyph even though other mappings from that same character code (or sequence of character codes) to other glyphs exist. Therefore the encoder which produced the character code as an encoding of text or other characters is unable to accurately communicate due to the ambiguity in the mapping at the decoder from the character code to more than one potential glyph.

The situations mentioned in the paragraph above are particularly acute in the case where the characters are emoji since relatively small changes in emoji glyphs can convey large differences in meaning. In the case of a text character such as the letter "a" for example, different glyphs of the letter "a" are generally interpreted as meaning the letter "a" successfully by end users due to the large amount of redundant information available from the text context. In the case of emoji there is less redundancy and so an increased need to have accurate encoding and decoding of emoji character codes.

Electronic devices such as smart phones, tablet computers, wearable computers and others often have out of date or missing fonts. This leads to unsupported character codes which are character codes that are mapped to default glyphs (such as a question mark, square or rectangle) or which are mapped to incorrect glyphs. An incorrect glyph is a glyph which is different from the glyph encoded by an entity which formed the character code (such as a sending device which sends a text message comprising character codes). An example of an incorrect glyph is a glyph of a specified character code which is present in the font of the electronic device but which is present as a different glyph in the font of an electronic device which created text content comprising the character code. Incorrect glyphs lead to a type of ambiguity, since the electronic device produces a glyph for a given character code but the produced glyph is potentially different from an intended glyph that a device which created text content comprising the character code intended.

Another example of an incorrect glyph is an unmodified character such as an unmodified emoji. Character codes for emoji may comprise a main emoji character code and subsequent combining code points that combine with the main emoji character code to form a modifier emoji. When the combining code points occur together with the main emoji character code, the device which interprets the character code (comprising both the main emoji character code and the subsequent combining code points) is able to modify an emoji glyph of the main emoji character code according to the subsequent combining code points. For example, to change the gender or color of an emoji. If the device which interprets the character code is unable to understand the subsequent combining code points but is able to understand the main emoji character code (as this is present in its font), the device maps the main emoji character code to its associated glyph, and subsequent combing code points to separate glyphs and the result is referred to as an unmodified emoji. In the same way unmodified characters occur, where there is a failure to modify a main character code by associated combining codes. An unmodified character is a type of incorrect glyph.

In the case of some characters such as emoji or other characters, users often have problems determining meanings of those characters. This can be the case for example, if a particular emoji is rare or new, or where the user is unfamiliar with emoji or is unable to recall emoji meanings. Where unsupported character codes occur the user can become confused and have trouble determining the intended meaning.

In some cases groups of two or more characters are used in an ordered sequence where the ordered sequence of characters has a particular meaning. An example of this is an emoticon which is a type of glyph or graphical representation formed from an ordered sequence of characters such as ":)". Another example is an ordered sequence of emoji which have a particular meaning. Where such ordered sequences of characters have particular meanings it can be especially difficult for users to detect the ordered sequence and to interpret the meaning. If one or more character codes in an ordered sequence is an unsupported character code the problem is exacerbated since even if the user can recall the ordered sequence he or she has trouble detecting it.

The graphical displays illustrated in FIG. 1 show a soft keyboard 124 displayed on a touchscreen display of an electronic device such as a smart phone or tablet computer. In the example of FIG. 1 a user is operating a short messaging service application at the electronic device and has received a message from Robyn which comprises the words "Just curious what is your ETA?" as well as a default glyph 126 in the form of a rectangle and an emoji 130. In this example, both the default glyph 126 and the emoji 130 have been formed from unsupported character codes received in a text message from Robyn's electronic device.

Previously it has not been straightforward for the user to find the unsupported character code in the electronic device which has resulted in the default glyph 126. The examples described herein describe how the user is able to extract this internal data from the electronic device in a simple and efficient manner. The electronic device detects a user indication that the user wishes to extract internal data from the electronic device regarding the default glyph 126 and as a result the electronic device renders a pop-up display 120 over the existing graphical user interface. The pop-up display comprises the correct glyph and a description of the correct glyph.

FIG. 1 illustrates the case of an ambiguous character code which has given rise to glyph 130. Where the device outputs internal data from the electronic device regarding glyph 130 the pop-up display 128 shows alternative glyphs corresponding to the ambiguous character code.

Figure 2:
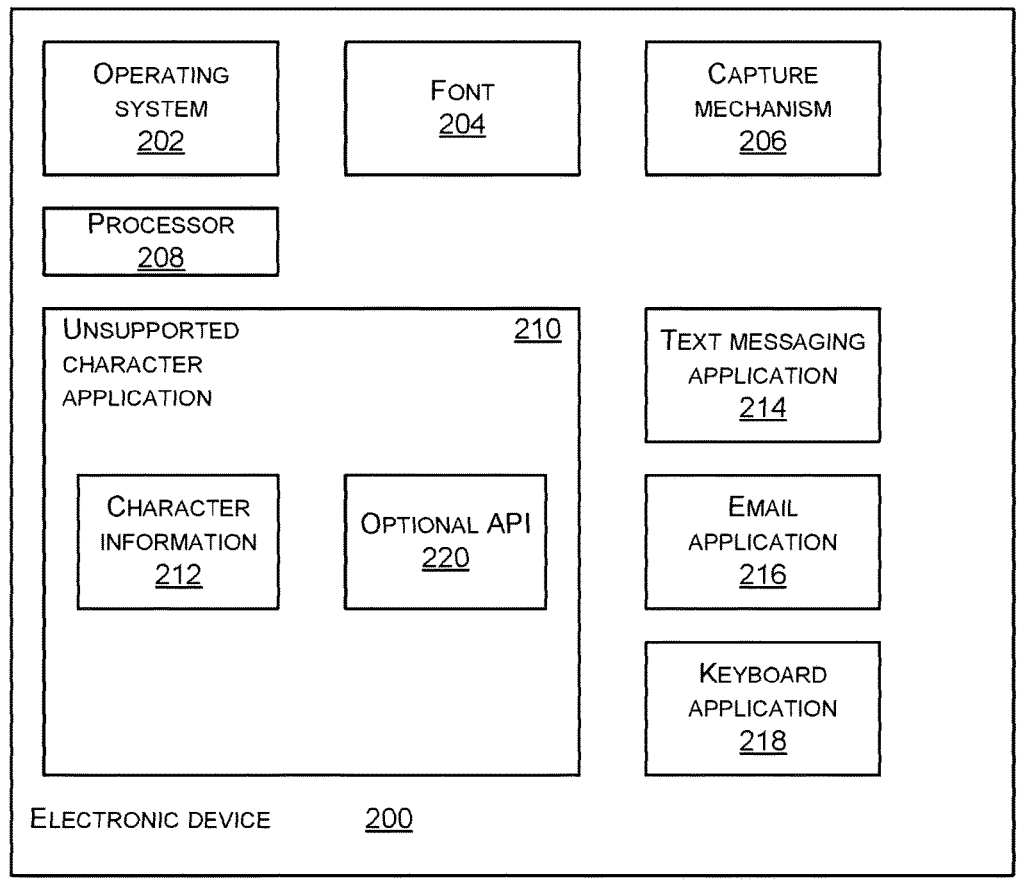
FIG. 2 is a schematic diagram of an electronic device such as that of FIG. 1.

FIG. 2 is a schematic diagram of an electronic device such as that of FIG. 1 and which comprises an unsupported character code detection mechanism. The electronic device 200 has an operating system 202 which controls the electronic device and which has access to a font 204 stored at the electronic device. The font comprises a mapping from character codes to glyphs. The electronic device has one or more processors 208 as described in more detail below with reference to FIG. 8. Installed on the electronic device are a plurality of software applications including unsupported character application 210 and at least one other application 214, 216, 218 which uses text in character code form. The unsupported character application 210 acts to detect unsupported character codes at the electronic device and it comprises character information 212. The character information 212 comprises mappings from character codes to glyphs and optionally comprises one or more of: character code descriptions, glyphs, alternative glyphs used for the same character code, character code use data, character code standards data, character codes themselves, lists of frequently misinterpreted character codes. The lists of frequently misinterpreted character codes may be manually configured in some cases or may be found by automated observation of character code use. The character information 212 is accessible to the unsupported character application 210 but not directly available to the operating system 202 or to the other applications 214, 216, 218 at least in some examples. In the example of FIG. 1 the other applications comprise a text messaging application 214, an email application 216 and a keyboard application 218 although these examples are not intended to limit the scope of the technology as other types of applications may be used.

The electronic device has a capture mechanism 206 arranged to capture text output where the text output is the result of converting character codes (from one or more of the applications 214, 216, 218 for example) into glyphs using the font 204. The text output is output by the processor 208 to a display device associated with the electronic device 200 such as a touch screen display, a projection by a display device of an augmented reality headset, a screen of a desktop computer, or any other display. In some examples the capture mechanism 206 comprises a screen reader application programming interface. In some examples the capture mechanism comprises an image capture mechanism which captures an image sent to the display and carries out optical character recognition on the image. More detail about the capture mechanism is given later in this document.

Data from the capture mechanism 206 is available to the unsupported character application 210 and comprises one or more of: a list of character codes, a list of user interface elements, display coordinates of user interface elements, images of user interface elements, an image of the display. The unsupported character application is arranged to detect unsupported character codes in the data from the capture mechanism 206 or associated with the data from the capture mechanism 206. Once an unsupported character code has been detected, information about the unsupported character code is retrieved from the character information 212 and is made available to the user via a pop-up display or overlay on the display.

In some examples the electronic device comprises an application programming interface 220 as part of the unsupported character application 210. The application programming interface makes the functionality of the unsupported character application and/or the store of character information 212 available to one or more of the other applications 214, 216, 218.

In some examples the application programming interface 220 enables the other applications to make use of any character fonts available in the character information. For example, the electronic device is configured to receive user input selecting a character font from a plurality of possible character fonts available in the character information. At least one of the applications is configured to render characters using the selected character font in preference to the font. In this way the other applications are able to utilize the character fonts (such as emoji fonts) in the character information.

Alternatively, or in addition, the functionality of the capture mechanism 206 or unsupported character application 210 or other elements of FIG. 2 is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
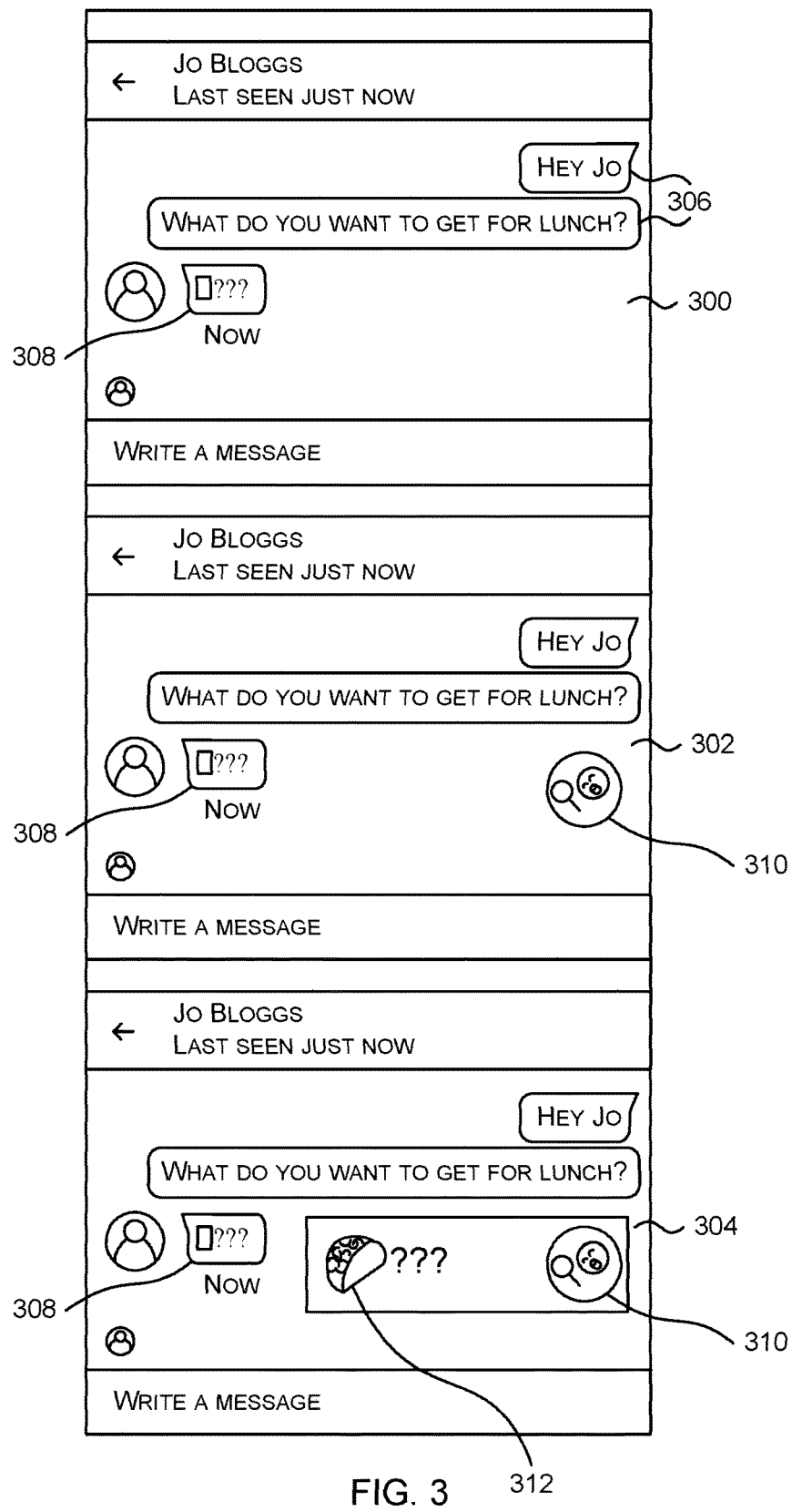
FIG. 3 is a schematic diagram of a sequence of three user interface displays of an electronic device which incorporates an unsupported character code detection mechanism.

FIG. 3 is a schematic diagram of a sequence of three user interface displays 300, 302, 304 of an electronic device such as that of FIG. 2 which incorporates an unsupported character code detection mechanism such as unsupported character application 210. The electronic device has two text messages 306 to the electronic device of Jo Bloggs. In response the electronic device has received text message 308 comprising an unsupported character code that has been mapped to a default glyph at the electronic device. In this case the default glyph is a rectangle and the rest of the received text message comprises three question marks.

The unsupported character application detects the presence of the unsupported character code on the display and gives an indication to the user. The indication in this case is an icon 310 rendered on the display. When the user taps on the icon 310 a panel associated with the icon expands. The panel overlays the graphical user interface of the messaging application being used to communicate with the electronic device of Jo Bloggs. The expanded panel comprises the correct glyph 312 which in this case is an emoji depicting a taco.

Figure 4:
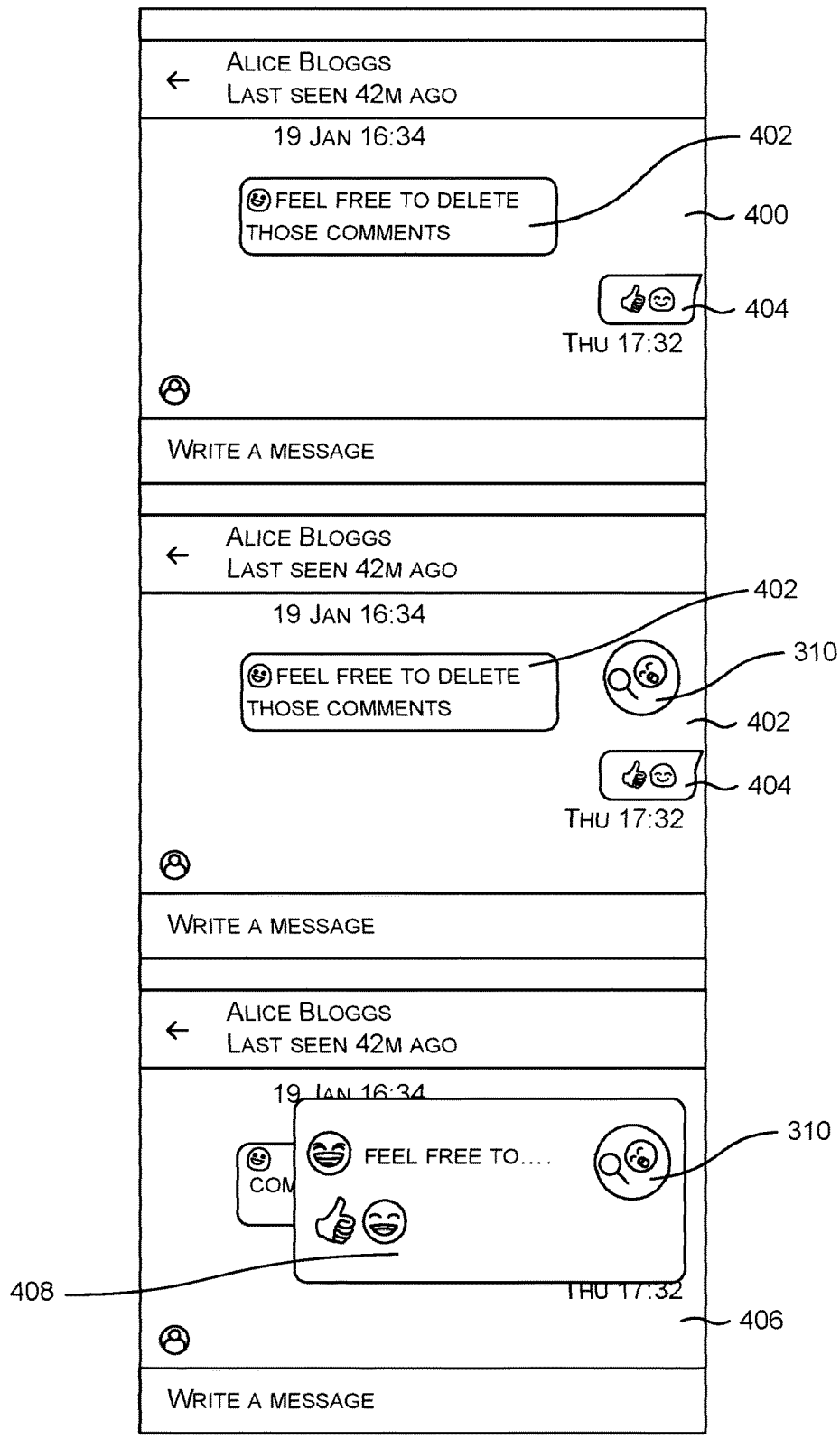
FIG. 4 is a schematic diagram of another sequence of three user interface displays of an electronic device which incorporates an unsupported character code detection mechanism.

FIG. 4 is a schematic diagram of another sequence of three user interface displays 400, 402, 406 of an electronic device which incorporates an unsupported character code detection mechanism such as the unsupported character application 210 of FIG. 2. The user of the electronic device receives a text message 402 comprising an emoji and the words "feel free to delete those comments". Other emoji 404 also appear on the page.

The unsupported character application 210 detects that the emoji in the message 402 is unsupported (in that it is ambiguous) and an icon 310 is rendered on the display to indicate to the user the presence of the unsupported emoji. When the user taps on the icon 310 a panel comprising the icon 310 expands and displays an alternative glyph for the character code of the ambiguous emoji as well as part of a character code description of the ambiguous emoji. The other emoji 404 which were present on the screen are also in the panel so that the user is able to select those to obtain their meanings.

Figure 5:
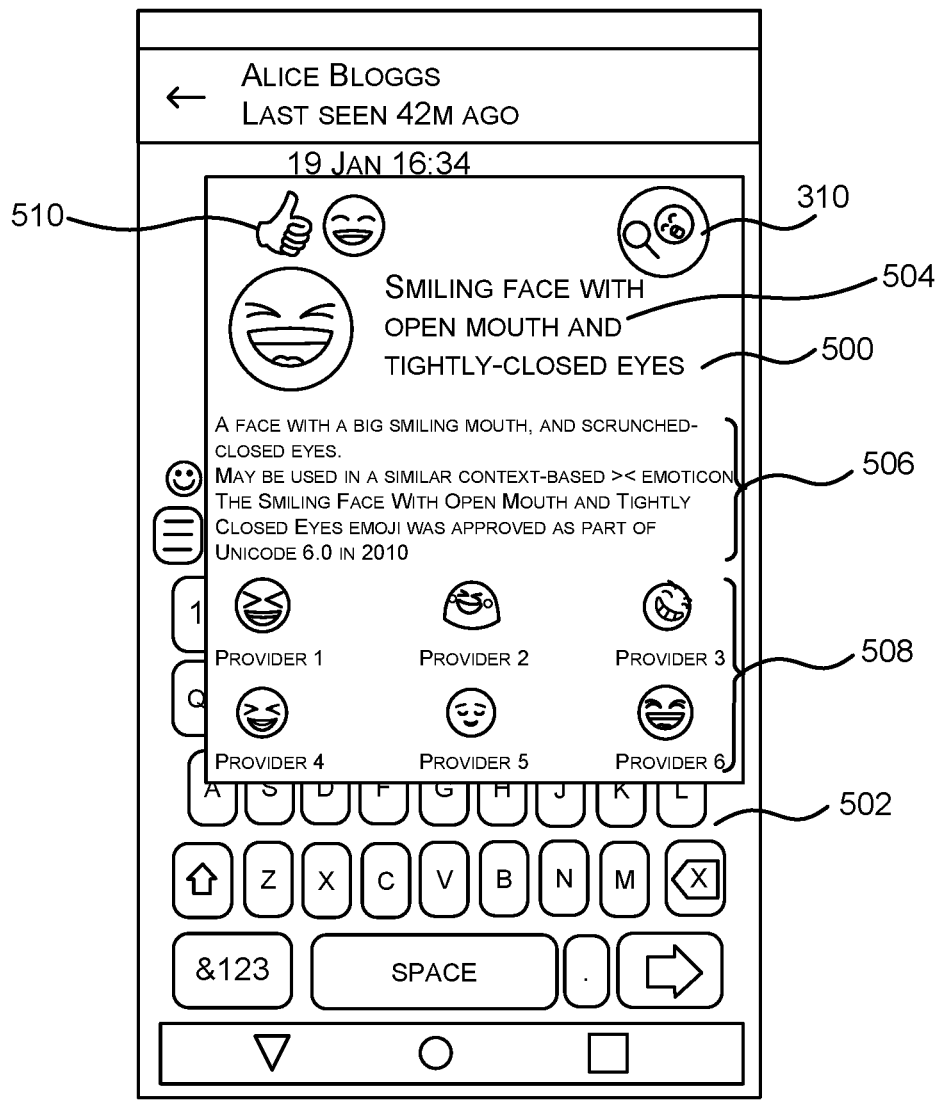
FIG. 5 is a schematic diagram of a user interface display which follows in the sequence of FIG. 4.

When the user taps on the first emoji in the panel 408 the panel expands further as indicated in FIG. 5 to show the full description 500 of the emoji, additional information 506 about the emoji and other glyphs 508 used for the same character code by different operating systems or different applications. The additional information about the emoji comprises a description of the appearance of the emoji, information about how the emoji is typically used, and information about the adoption date of the emoji in the Unicode standard. The panel expands to overlay a soft keyboard 502 or other graphical user interface at the electronic device. The panel includes the other emoji 510 that were on the page so the user can quickly check them too.

The examples given in FIGS. 3 to 5 concern emoji in text messages received at an electronic device. However, these examples are also applicable to the situation where a user is operating the electronic device to create and send text messages.

Figure 6:
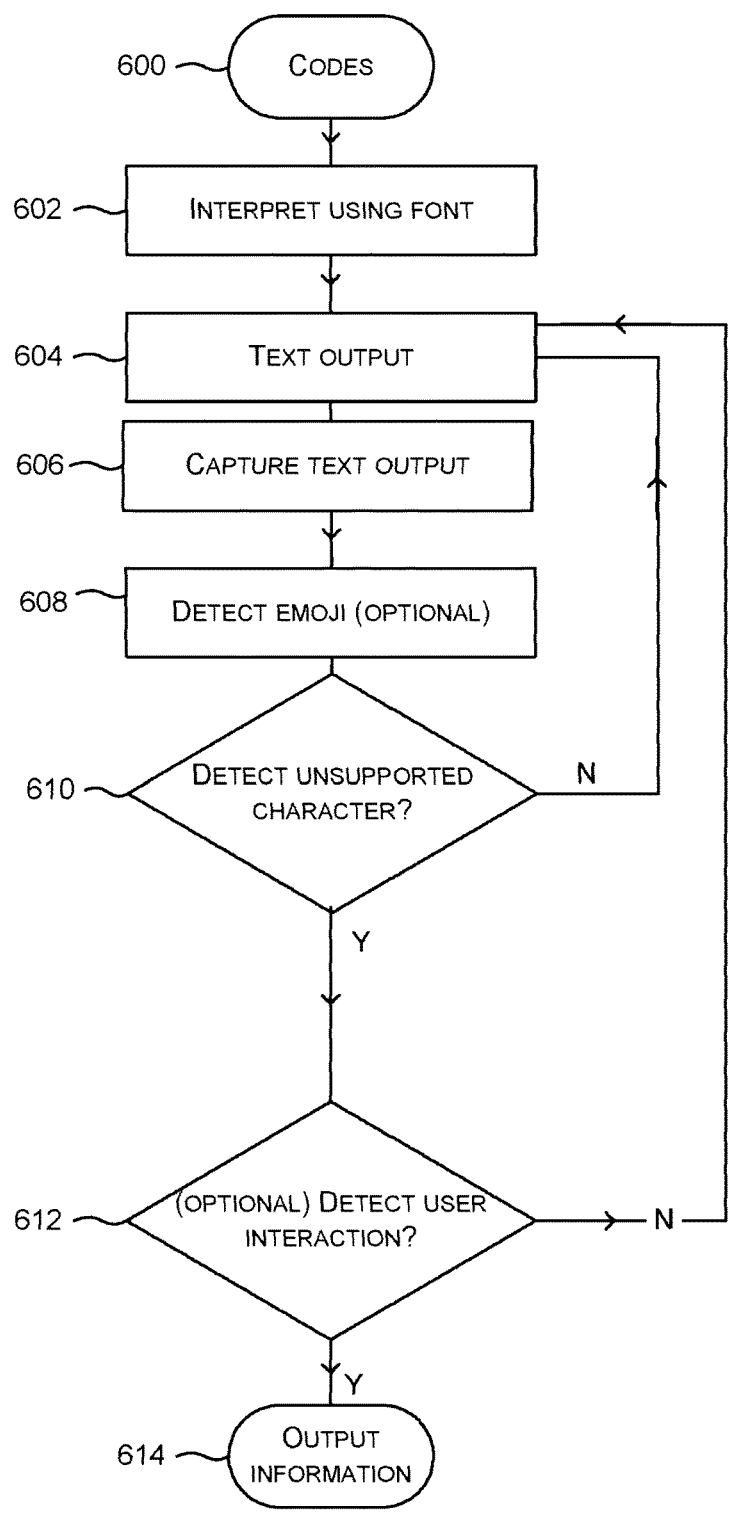
FIG. 6 is a flow diagram of a method of operation at an electronic device such as that of FIGS. 1 and 2.

FIG. 6 is a flow diagram of a method of operation at an electronic device such as that of FIGS. 1 and 2. Character codes, such as Unicode code points 600 are formed or received at an application executing at an electronic device, such as any of the text messaging application 214, email application 216 or keyboard application 218 of FIG. 2. The character codes are interpreted using the font 204 by the operating system 202 and/or processor 208 of the electronic device. The interpretation comprises mapping the character codes to glyphs using the font 204 to form text output 604 which is sent to a display associated with the electronic device. In some cases the text output 604 is rendered at a touch screen of the electronic device for example. In some cases the text output 604 is projected from a projector onto a display such as a wall of a room, or projected into the eye of a wearer of a head mounted computing device.

Some or all of the text output at text output operation 604 is captured 606 using capture mechanism 206. The output of the capture mechanism comprises one or more of: a list of character codes, a list of user interface elements, display coordinates of user interface elements, images of user interface elements, an image of the display. There is then an optional operation 608 to detect emoji in the captured text output. In an example, this is achieved in an efficient manner by using a search trie as explained below with reference to FIG. 7 However, it is not essential to use a search tree as other sorting or searching processes may be used such as using any one or more of: a hash table, binary search tree, regular expression, finite state machine, Boyer-Moore string search algorithm. Particular efficiencies are found when using a search trie or finite state machine.

The electronic device detects 610 whether the output from the capture mechanism comprises one or more unsupported character codes. This is done in one or more of a variety of ways. In some cases, where the output from the capture mechanism comprises character codes, the electronic device compares these character codes with character codes in a list of frequently misinterpreted character codes stored in the character information 212. In some cases, where the output from the capture mechanism comprises character codes, the electronic device checks if these character codes can be mapped using the font 204. This is done by sending a query to the operating system using an application programming interface in some cases. In some cases where the output from the capture mechanism comprises an image or part of an image, the check 610 is done by performing template matching between the image or part of an image and a template of a default glyph such as a rectangle, square or question mark. Where optical character recognition has been used and the output of the optical character recognition comprises character codes it is possible that a character code of a default glyph will be present. Therefore the electronic device checks for this where appropriate. Any combination of one or more of the types of check 610 mentioned above may be used.

If no unsupported character is found at check 610 the process returns to operation 604. If an unsupported character is found the electronic device outputs an indication to the user in some cases. For example, the icon 310 of FIG. 3. The electronic device optionally checks 612 for user interaction such as a tap on the icon 310 or other user interaction. The user interaction may be a pause in user interaction events observed at the electronic device. The user interaction may be a touch on a touch screen, an audio input such as a spoken command, or any combination of different types of user interaction. If a user interaction check is made and no user interaction is found, the process returns to operation 604. If a user interaction check is made and a user interaction is found, the process proceeds to operation 614.

Operation 614 involves the electronic device retrieving information about the unsupported character from the character information and outputting 614 the retrieved information.

In some examples, the method of FIG. 6 is modified so that whenever an emoji is detected in the captured text, information about the meaning of that emoji is available to the user when he or she gives an input requesting that information, no matter whether the emoji is from an unsupported character code or not.

In some examples, the method of FIG. 6 is modified to operate for sequences of two or more characters in order that a user is able to access information about the meaning of the sequence of characters. In this case the character information store holds data about known sequences of characters and their associated meanings. Sequences of characters found in the captured text are checked against the known sequences in the character information store, and if a match is found, the meaning of the sequence of characters is displayed.

Where one or more of the characters in a sequence of characters has an unsupported character code, the process of FIG. 6 is used to find a correct character code. The correct character code is then used together with the sequence of characters to find a match with a known sequence of characters in the character information store. Once a match is found, the meaning of the sequence of characters is made available to the user via the display.

Figure 7:
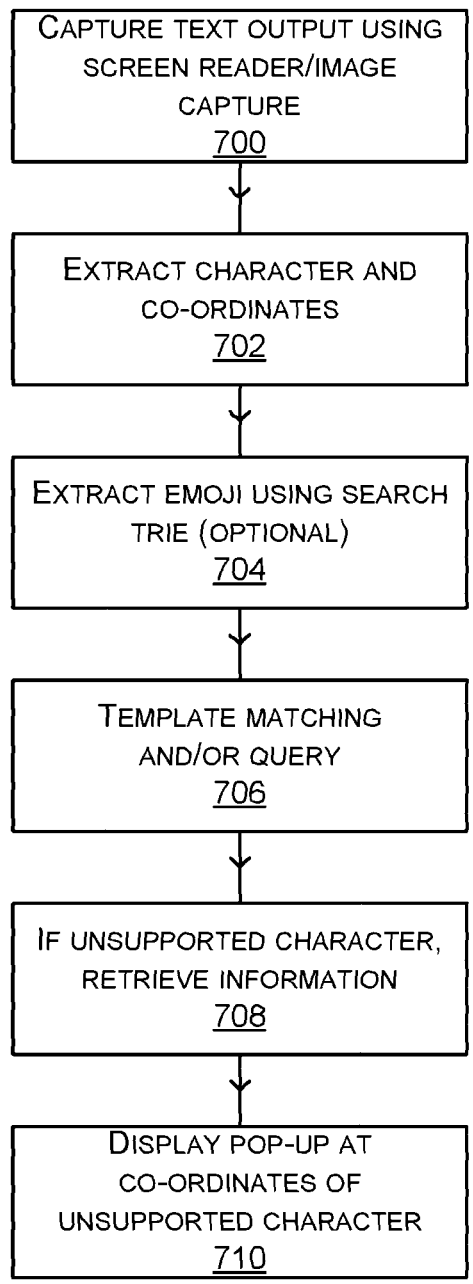
FIG. 7 is a flow diagram of part of the method of FIG. 6 in more detail.

More detail about some of the operations of FIG. 6 is now given with reference to FIG. 7. The capture mechanism captures 700 text output to a display associated with the electronic device by using an accessibility application programming interface and/or by using software which captures an image of what is displayed on the screen. An accessibility application programming interface is a plurality of functions which can be used to query the operating system of the electronic device in order to request a copy of text being displayed on the screen. The copy of the text being displayed on the screen comprises Unicode code points (or other character codes) of the text. The copy of the text is broken down into strings associated with different user interface elements. The accessibility application programming interface is also configured to enable queries to be sent to retrieve information from the operating system about the user interface elements and their associated screen coordinates. By using the accessibility application programming interface the electronic device is thus able to extract 702 characters and their screen coordinates from the captured text.

Where an image of what is displayed on the screen is captured, optical character recognition is used to obtain character codes of characters in the image. The captured image also comprises coordinates of the characters displayed on the screen.

In some examples, where unsupported emoji are to be detected, the electronic device extracts emoji from the captured text. This is done by searching for character codes in a particular range or with known values. The search is achieved in a particularly efficient manner in some cases by using a search trie.

A search trie is an ordered tree data structure. The root node is associated with the empty string and the immediate descendants of the root node are used to represent potential values of first characters of a string. The descendants of a node have a common prefix of the string associated with that node. The code points of known emoji are pre-populated in to the search trie. Where the capture mechanism comprises a string of Unicode code points these code points are looked up within a search trie to extract emojis. Suppose the string of Unicode code points is "1234" (using numbers to represent code points) and suppose that "23" is an emoji, the search process begins at the root of the trie and checks if the string "1234" is present in the trie and finds this to be rejected (as there are no immediate descendant from the root node for the number 1. The search process proceeds to check if the string "234" is present in the trie and finds this to return "23" as a match and to move a cursor past this match. The cursor represents the point in the search trie at which the search has reached. Once the emoji are identified they are checked to see if they have unsupported character codes. Checking for unsupported character codes is done as described with reference to FIG. 6 by template matching and/or by querying 706 the operating system.

In the case of an unsupported character code the electronic device retrieves information from the store of character information about the unsupported character code. Some or all of the retrieved character information is displayed 710 at a pop up display in the vicinity of the coordinates of the unsupported character.

Figure 8:
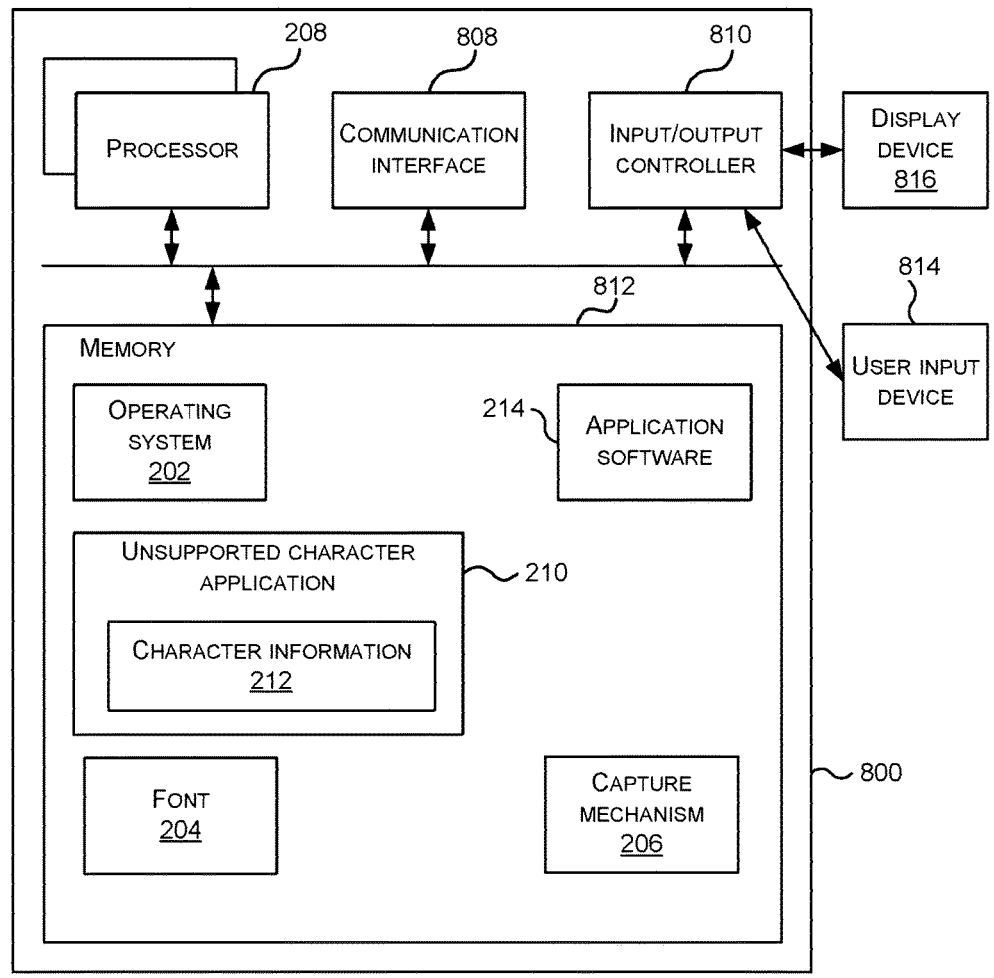
FIG. 8 is a schematic diagram of an exemplary computing-based device in which embodiments of an unsupported character code detection mechanism is implemented.

FIG. 8 illustrates various components of an exemplary computing-based device 800 which is implemented as any form of computing and/or electronic device, and in which embodiments of an unsupported character code detection mechanism are implemented in some examples.

Computing-based device 800 comprises one or more processors 208 which are microprocessors, controllers or any other suitable type of processors for processing computer executable instructions to control the operation of the device in order to detect unsupported character codes. In some examples, for example where a system on a chip architecture is used, the processors 208 include one or more fixed function blocks (also referred to as accelerators) which implement a part of the method of FIGS. 6 and 7 in hardware (rather than software or firmware). Platform software comprising an operating system 202 or any other suitable platform software is provided at the computing-based device to enable application software 214 to be executed on the device. A font 204 is stored at the electronic device and is used by the operating system 202 to map character codes to glyphs. A capture mechanism 206 at the electronic device comprises an accessibility application programming interface and/or image capture functionality to capture what is displayed at a display device 816 associated with the electronic device 800. An unsupported character application 210 at the electronic device stores character information 212 and has functionality to detect unsupported characters in text captured by the capture mechanism 206.

The computer executable instructions are provided using any computer-readable media that is accessible by computing based device 800. Computer-readable media includes, for example, computer storage media such as memory 812 and communications media. Computer storage media, such as memory 812, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 812) is shown within the computing-based device 800 it will be appreciated that the storage is, in some examples, distributed or located remotely and accessed via a network or other communication link (e.g. using communication interface 808).

The computing-based device 800 also comprises an input/output controller 810 arranged to output display information to a display device 816 which may be separate from or integral to the computing-based device 800. The display information may provide a graphical user interface. The input/output controller 810 is also arranged to receive and process input from one or more devices, such as a user input device 814 (e.g. a mouse, keyboard, camera, microphone or other sensor). In some examples the user input device 814 detects voice input, user gestures or other user actions and provides a natural user interface (NUI). This user input may be used to trigger a pop up display of information about an unsupported character and to control the amount of information in the pop up display. In an embodiment the display device 816 also acts as the user input device 814 if it is a touch sensitive display device. The input/output controller 810 outputs data to devices other than the display device in some examples, e.g. a locally connected printing device.

Any of the input/output controller 810, display device 816 and the user input device 814 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively or in addition to the other examples described herein, examples include any combination of the following:

An electronic device comprising:

a memory storing a font comprising a mapping from character codes to glyphs;

the memory storing character information comprising at least information about one or more unsupported character codes;

a processor which processes text content comprising character codes using the font to create text output by converting the character codes into glyphs for display at a display associated with the electronic device;

the processor configured to capture the text output and detect whether the text output comprises at least one unsupported character code;

the processor configured, in the case that at least one unsupported character code is detected, to output to a user of the device information about the unsupported character code obtained from the character information.

The electronic device described above comprising a plurality of different applications executable at the electronic device and wherein the capture mechanism captures the text output by capturing text output originating from at least one of the applications.

The electronic device described above wherein the capture mechanism uses an accessibility application programming interface to query the operating system.

The electronic device described above wherein the capture mechanism captures an image of what is rendered at the display and applies optical character recognition to the captured image.

The electronic device described above wherein the capture mechanism obtains from an operating system of the electronic device details of user interface elements and associated coordinates.

The electronic device described above wherein the processor is configured to detect at least one emoji in the captured text output by using a search trie or a finite state machine, and to detect the unsupported character code by using the at least one emoji.

The electronic device described above wherein the processor is configured to check whether the at least one character code is unsupported by using an application programming interface to send a query to an operating system of the electronic device.

The electronic device described above wherein the processor is configured to check whether the at least one character code is unsupported by using a template matching process.

The electronic device described above wherein the processor is configured to carry out the template matching process by making a pixel by pixel comparison with a known unsupported glyph.

The electronic device described above wherein the processor is configured to identify a character code as being unsupported at least when a glyph of the character code in the font is different from a glyph of the character code in the character information.

The electronic device described above wherein the processor is configured to detect a specified user interaction and to output the information about one or more unsupported character codes in response to the detected specified user interaction.

The electronic device described above wherein the processor is configured to output the information using a visual display over the top of a display at which an unsupported character is output.

The electronic device described above wherein the processor is configured to output a user interface element at a location on the display which is associated with the unsupported character code.

The electronic device described above further comprising:

a plurality of applications executable at the electronic device, one of the applications being a master of the character information stored at the electronic device and comprising an application programming interface configured to make the character information available to one or more of the other applications.

The electronic device described above wherein the processor is configured to receive user input selecting a character font from a plurality of possible character fonts available in the character information, and wherein at least one of the applications is configured to render characters using the selected character font in preference to the font.

A computer-implemented method comprising:

storing, at a memory, a font comprising a mapping from character codes to glyphs;

storing, at the memory, character information comprising at least information about one or more unsupported character codes;

processing text content comprising character codes using the font to create text output by converting the character codes into glyphs;

capturing the text output and detecting whether at least one unsupported character code is associated with the captured text output; and in the case that at least one unsupported character code is detected, outputting information about the unsupported character obtained from the character information.

The method described above comprising capturing text output originating from at least one a plurality of different applications executing at the electronic device.

The method described above wherein capturing the text output comprises using an accessibility application programming interface to query the operating system.

The method described above wherein capturing the text output comprises capturing an image of what is rendered at the display and applying optical character recognition to the captured image.

An electronic device comprising:

means for storing a font comprising a mapping from emoji character codes to glyphs;

means for storing emoji information comprising at least information about one or more unsupported emoji character codes;

means for processing text content comprising character codes using the font to create text output by converting the character codes into glyphs;

means for capturing the text output and detecting whether the captured text has at least one associated emoji character code, and, in the case that at least one emoji character code is detected, checking whether the at least one emoji character code is unsupported; and means for, in the case that the least one detected emoji character code is unsupported, displaying information about the unsupported emoji character code.

The examples illustrated and described herein as well as examples not specifically described herein but within the scope of aspects of the disclosure constitute exemplary means for detecting unsupported character codes. For example, the elements illustrated in FIG. 2 and FIG. 8, such as when encoded to perform the operations illustrated in FIG. 6 or 7, constitute exemplary means for detecting unsupported character codes. For example, the means for storing a font is the memory 812. For example, the means for processing text content comprising character codes using the font to create text output is the processor 208 with suitable instructions. For example, the means for capturing the text output is the capture mechanism 206 such as an accessibility API or an image capture mechanism with an optical character recognition capability. For example, the means for detecting whether the captured text has at least one associated emoji character code is the processor 208 with suitable instructions. For example, the means for checking whether the emoji character code is unsupported is the processor 208 with suitable instructions. For example, the means for displaying information about the unsupported emoji character code is the processor with suitable instructions, the character information 212 and the display device 816.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computing device comprising:
    a processor;
    a memory communicatively coupled to the processor storing thereon:
        a font comprising a mapping from character codes to glyphs;
        character information comprising at least information about one or more unsupported character codes; and
        computer-executable instructions that, upon execution by the processor, perform operations comprising:
            using the font, processing text content comprising character codes to create text output by converting the character codes into glyphs for display on a screen communicatively coupled to the computing device;
            using a capture mechanism, capturing the text output and, based on the captured text output, outputting data comprising at least one of: a list of character codes, a list of user interface elements, images of user interface elements, or an image of the display;
            detecting at least one unsupported character code in the data or associated with the data, the at least one unsupported character code corresponding to a default glyph or an ambiguous glyph in the text output; and,
        in response to detection of the at least one unsupported character code, indicating the unsupported character code with a user interface element displayed at a location on the screen that is associated with the unsupported character code; and,
        in response to a specified user interaction with the user interface element, outputting information about the unsupported character code obtained from the character information via a pop-up display or overlay.

2. The computing device of claim 1, wherein the capturing the text output comprises capturing text originating from at least one of a plurality of applications that are executable on the computing device.

3. The computing device of claim 2 wherein the capturing the text output further comprises using an accessibility application programming interface to query an operating system running on the computing device.

4. The computing device of claim 2 wherein the capturing the text output further comprises capturing an image of what is rendered at the display and applying optical character recognition to the captured image.

5. The computing device of claim 2 further comprising obtaining, from an operating system of the computing device, details of user interface elements and associated coordinates.

6. The computing device of claim 2 further comprising computer-executable instructions that, upon execution by the processor, perform operations comprising:
   detecting at least one emoji in the captured text output by using a search trie or a finite state machine; and
   detecting the unsupported character code by using the at least one emoji.

7. The computing device of claim 1 wherein the at least one unsupported character code is detected using an application programming interface to send a query to an operating system of the computing device.

8. The computing device of claim 1 wherein the at least one unsupported character code is detected using a template matching process.

9. The computing device of claim 8 wherein using the template matching comprises a pixel by pixel comparison with a known unsupported glyph.

10. The computing device of claim 1 a character code is identified as being unsupported at least when a glyph of the character code in the font is different from a glyph of the character code in the character information.

11. The computing device of claim 1 further comprising a plurality of applications executable by the computing device, wherein at least one of the applications is a master of the character information stored at the computing device and comprises an application programming interface configured to make the character information available to others of the plurality of applications.

12. The computing device of claim 11 further comprising computer-executable instructions that, upon execution by the processor, perform operations comprising receiving user input indicative of a selected character font from a plurality of character fonts available in the character information, and wherein at least one of the applications is configured to render characters using the selected character font in preference to the font.

13. A computer-implemented method comprising:
   storing, at a memory of a computing device, a font comprising a mapping from character codes to glyphs;
   storing, at the memory, character information comprising at least information about one or more unsupported character codes;
   processing, by the computing device, text content comprising character codes using the font to create text output by converting the character codes into glyphs for display on a screen;
   capturing, by the computing device, the text output and, based on the captured text output, outputting data comprising at least one of: a list of character codes, a list of user interface elements, images of user interface elements, or an image of the display;
   detecting at least one unsupported character code in the data or associated with the data, the at least one unsupported character code corresponding to a default glyph or an ambiguous glyph in the captured text output; and
   in response to detection of the at least one unsupported character code, indicating the unsupported character code with a user interface element displayed at a location on the screen that is associated with the unsupported character code; and,
   in response to a specified user interaction with the user interface element, outputting information about the unsupported character obtained from the character information via a pop-up display or overlay.

14. The method of claim 13 further comprising capturing text output originating from at least one a plurality of different applications executing at the computing device.

15. The method of claim 13 wherein capturing the text output comprises using an accessibility application programming interface to query an operating system of the computing device.

16. An electronic device comprising:
   means for storing a font comprising a mapping from emoji character codes to glyphs;
   means for storing emoji information comprising at least information about one or more unsupported emoji character codes;
   means for processing text content comprising character codes using the font to create text output by converting the character codes into glyphs for display on a screen;
   means for capturing the text output and detecting whether the captured text has at least one associated emoji character code;
   means for checking whether the at least one emoji character code is unsupported when at least one emoji character code is detected; and
   means for displaying, in response to the at least one detected emoji character code being unsupported, a user interface element at a location on the screen that is associated with the unsupported character code, and for outputting, in response to a specified user interaction with the user interface element, information about the unsupported emoji character code.

* * * * *